Sept. 30, 1958     E. C. SPARKS, JR     2,854,621
VERNIER TEMPERATURE COMPENSATING CAPACITANCE SYSTEM
Filed April 22, 1954
CAPACITANCE OF 1 $\gg$ CAPACITANCE OF 2a
CAPACITANCE OF 3 $\gg$ CAPACITANCE OF 2b
CAPACITANCE OF 1 $\approx$ CAPACITANCE OF 3
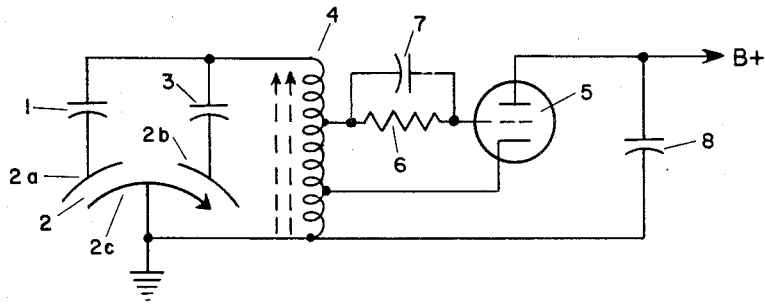
Fig. 1
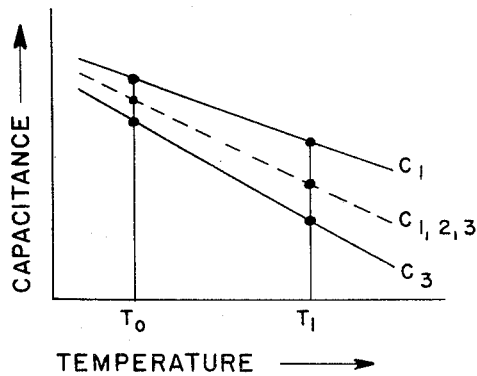
Fig. 2
Earl C. Sparks, Jr.
*INVENTOR.*
BY 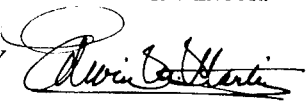
Attorney

United States Patent Office 2,854,621
Patented Sept. 30, 1958

2,854,621

VERNIER TEMPERATURE COMPENSATING CAPACITANCE SYSTEM

Earl C. Sparks, Jr., Bedford, Mass., assignor, by direct and mesne assignments, of one-half each to Sanders Associates, Inc., Nashua, N. H., a corporation of Delaware, and Willys Motors, Inc., a corporation of Pennsylvania Application April 22, 1954, Serial No. 424,992

5 Claims. (Cl. 323—74)

This invention relates to temperature compensated capacitors. More particularly, it relates to a system for vernier control of temperature compensation for capacitors.

Modern electronic apparatus, as used, for example, in guided missiles and other aircraft applications, is subject to sudden and large temperature changes. It is very difficult under such circumstances to maintain an accurate control of frequency of generated signals. It is known in the past to use temperature compensated capacitors. Such capacitors are only accurate to within one or two percent. For applications where a high degree of frequency control is required, for example frequency drifts less than five parts per million, the conventional temperature compensated capacitor is inadequate.

It is, therefore, an object of the present invention to provide an improved temperature compensating capacitance system.

A further object of the invention is to provide an improved temperature compensating capacitance system that can be precisely controlled.

Still another object of the invention is to provide an improved temperature compensating capacitance system capable of maintaining signal frequencies constant to within five parts per million.

In accordance with the invention there is provided a vernier, temperature compensating, capacitance system. This system includes a first capacitor having a first predetermined capacity-versus-temperature slope and a second capacitor connected in series with the first capacitor. The second capacitor has a capacitance relatively invariant with respect to temperature changes. A third capacitor is provided having a second capacitance-versus-temperature slope slightly more negative than the first slope. A fourth capacitor is connected in series with the third capacitor and has a capacitance relatively invariant with respect to temperature changes. The first and second capacitors are connected and parallel with the third and fourth capacitors. Means are provided for obtaining a vernier adjustment of the second and fourth capacitors so that the capacitance of the system varies in accordance with a capacity-versus-temperature slope that ranges only between the first and second slopes, while remaining substantially constant with respect to the adjustment of the second and fourth capacitors.

In the accompanying drawings, Fig. 1 is a schematic circuit diagram of a system embodying the present invention, and Fig. 2 is a graph illustrating variations in capacity with respect to variations in temperature of elements of the system in Fig. 1.

Referring now to Fig. 1, there is here illustrated an oscillator circuit, comprising capacitors 1 and 3 and differential capacitor 2, which are connected in parallel with a variable inductor 4. A triode amplifying vacuum tube 5 is connected to the inductor 4. The cathode of tube 5 is connected to a tap on inductor 4, and its grid is connected through grid bias resistor 6 to a second tap on inductor 4, as shown. In parallel with the resistor 6 is a grid bias capacitor 7. Its plate is connected to a source of relatively high voltage labeled B+. The plate is also connected through bypass capacitor 8 to ground, as shown.

Ordinarily, an increase of the ambient temperature effects an increase in the value of inductance or capacity which determines the resonant frequency of the system. These changes may be due to variations in the tube, wiring and other physical parameters.

The effect of the increase in the value of inductance or capacity is to decrease the resonant frequency of the system. Many systems have been proposed in the prior art to compensate for this effect. It is common, for example, to provide a temperature controlled oven at a temperature above that which might reasonably be encountered. Such a system is impractical for guided missiles since the operating temperatures are relatively high.

The use of crystals for controlling frequency is limited by the resonant frequency of each crystal. Where a continuously variable frequency oscillator is desired, crystal oscillators may become impractical or objectionable.

A third approach to this problem embodies the use of so-called temperature compensating capacitors. Capacitors are available commercially having a capacitance that varies in a predetermined manner with respect to variations in temperature. Such devices are useful within the limit of approximately one percent accuracy of frequency control. Where greater accuracies are required, for example five parts in a million, it is not possible to predict in advance the characteristic slope that will be required for a particular system.

In the present invention the capacitor 1 has, for example, a capacitance that varies with respect to temperature as illustrated by the curve $C_1$ in Fig. 2. The capacitor 3 has a capacitance that varies with respect to temperature as illustrated by the curve $C_3$. The slope $$\frac{dC}{dT}$$

of $C_1$ is chosen to be less than that required to maintain the frequency constant with changes in temperature, and the slope $$\frac{dC}{dT}$$

of $C_3$ is chosen to be greater than that required to maintain the frequency of oscillation constant with respect to changes in temperature. The slope $C_3$ is thus only slightly more negative than the slope $C_1$. A first capacitor 1 having a first predetermined capacity-versus-temperature slope is connected in series with a second capacitor, sections $2a$ and $2c$ of differential capacitor 2, having a capacitance relatively invariant with respect to temperature changes. A third capacitor 3 having a second capacitance-versus-temperature slope slightly more negative than the first slope is connected in series with a fourth capacitor, sections $2b$ and $2c$ of the differential capacitor 2, having a capacitance relatively invariant with respect to temperature changes. The first and second capacitors 1 and 3 are connected in parallel as shown with the third and fourth capacitors $2a$ and $2b$. The plate $2c$ of the capacitor 2 is rotatable and hence provides means for providing a vernier adjustment of the second and fourth capacitors $2a$ and $2b$ so that the capacitance of the system varies in accordance with a capacity-versus-temperature slope ranging only between the first and second slopes, while remaining substantially constant with respect to the adjustment of the second and fourth capacitors 2a and 2b. Differential capacitor 2 provides a precise control whereby the slope $$\frac{dC}{dT}$$

of the capacitance of the system may be continuously varied from the slope $$\frac{dC}{dT}$$

of the curve $C_1$ to that of the curve $C_3$.

The differential capacitor 2 is so chosen that the variation of the rotor 2c effects no change in total capacitance of its sections 2a and 2b; for example, 10 micromicrofarads, and remains relatively invariant with respect to temperature changes. If capacitor 1 is chosen equal to capacitor 3 and is large relative to capacitor 2, for example 100 micromicrofarads, the primary resonating capacity in the circuit is then the total of capacitors 2a and 2b. An increase in the value of capacitor 2a effects an equivalent decrease in the value of capacitor 2b.

The total capacity of the system may be represented by the expression:

(1) $$C_{1,2,3} = \underbrace{\frac{C_1 C_{2a}}{C_1 + C_{2a}}}_{(a)} + \underbrace{\frac{C_3 C_{2b}}{C_3 + C_{2b}}}_{(b)}$$

Since an increase in the value of capacitor 2a is accompanied by an eqivalent decrease in the value of capacitor 2b and vice versa, it is clear from expression (1) that a variation in the term (1)(b) effects an equivalent variation in the term (1)(a) to maintain the capacity of the system $C_{1,2,3}$ substantially constant with respect to an adjustment of $C_2$.

The desired variation of capacitance of the system with respect to temperature changes may be obtained by adjusting $C_2$ at a known temperature $T_0$ and rechecking at a different known temperature $T_1$. Since the frequency shifts with a change in capacity, the measure of frequency shift for the two temperatures may be employed as an indication for adjusting capacitor 2.

Accurate control of many frequency sensitive systems, such as RC and LC filters, etc., may be effected by electronic devices embodying the present invention. The theory of the device described above may, of course, be applied to other circuit elements such as resistors and inductors.

While there has been hereinbefore described what is at present considered a preferred embodiment of the invention, it will be apparent that many and various changes and modification may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A vernier, temperature-compensating, capacitance system comprising: a first capacitor having a first predetermined capacity-versus-temperature slope; a second capacitor connected in series with said first capacitor having a capacitance relatively invariant with respect to temperature changes; a third capacitor having a second capacitance-versus-temperature slope slightly more negative than said first slope; a fourth capacitor connected in series with said third capacitor having a capacitance relatively invariant with respect to temperature changes, said first and second capacitors being connected in parallel with said third and fourth capacitors; and means for providing a vernier adjustment of said second and fourth capacitors so that the capacitance of said system varies in accordance with a capacity-versus-temperature slope ranging only between said first and second slopes, while remaining substantially constant with respect to said adjustment of said second and fourth capacitors.

2. A vernier, temperature-compensating, capacitance system comprising: a first capacitor having a first negative capacity-versus-temperature slope; a second capacitor connected in series with said first capacitor having a capacitance relatively invariant with respect to temperature changes; a third capacitor having a second capacity-versus-temperature slope slightly more negative than said first slope; a fourth capacitor connected in series with said third capacitor having a capacitance relatively invariant with respect to temperature changes, said first and second capacitors being connected in parallel with said third and fourth capacitors; and means for providing a vernier adjustment of said second and fourth capacitors so that the capacitance of the system varies in accordance with a capacity-versus-temperature slope ranging only between said first and second slopes while remaining substantially constant with respect to said adjustment of said second and fourth capacitors.

3. A vernier, temperature-compensating, capacitance system comprising: a first capacitor having a first negative capacity-versus-temperature slope; a second capacitor connected in series with said first capacitor having a capacitance substantially less than that of said first capacitor and relatively invariant with respect to temperature changes; a third capacitor having a second capacity-versus-temperature slope slightly more negative than said first slope; a fourth capacitor connected in series with said third capacitor having a capacitance substantially less than that of said third capacitor and relatively invariant with respect to temperature changes, said first and second capacitors being connected in parallel with said third and fourth capacitors; and means for providing a vernier adjustment of said second and fourth capacitors so that the capacitance of the system varies in accordance with a capacity-versus-temperature slope ranging only between said first and second slopes while remaining substantially constant with respect to said adjustment of said second and fourth capacitors.

4. A vernier, temperature-compensating, capacitance system comprising: a first capacitor having a first negative capacity-versus-temperature slope; a second capacitor connected in series with said first capacitor having a capacitance substantially less than one-tenth that of said first capacitor and relatively invariant with respect to temperature changes; a third capacitor having a second capacity-versus-temperature slope slightly more negative than said first slope; a fourth capacitor connected in series with said third capacitor having a capacitance substantially less than one-tenth that of said third capacitor and relatively invariant with respect to temperature changes, said first and second capacitors being connected in parallel with said third and fourth capacitors; and means for providing a vernier adjustment of said second and fourth capacitors so that the capacitance of the system varies in accordance with a capacity-versus-temperature slope ranging only between said first and second slopes while remaining substantially constant with respect to said adjustment of said second and fourth capacitors.

5. A vernier, temperature-compensating, capacitance system having an adjustable capacity-versus-temperature slope, comprising: two parallel capacitive circuit legs, the first of said legs including a capacitor having a first capacity-versus-temperature slope; the second of said legs including a capacitor having a second capacity-versus-temperature slope only slightly more negative than said first slope; and a pair of ganged variable capacitors, one of said pair of capacitors being serially connected in each of said legs, the respective plates of said pair of ganged capacitors being 180° out of phase so that as the capacitance of one capacitor increases the capacitance of the other capacitor decreases varying the total capacitance of each leg in opposite directions by substantially the same amount to provide a vernier adjustment of the capacity-versus-temperature slope for the system ranging between said first and second slopes.

References Cited in the file of this patent

UNITED STATES PATENTS

| | | |
|---|---|---|
| 1,616,622 | Horton | Feb. 8, 1927 |
| 2,235,019 | Johannson | Mar. 18, 1941 |
| 2,281,461 | Smith | Apr. 28, 1942 |
| 2,718,617 | Connor | Sept. 20, 1955 |